United States Patent
Jiang et al.

(10) Patent No.: US 10,712,871 B2
(45) Date of Patent: Jul. 14, 2020

(54) METHOD FOR PROCESSING SIGNAL FROM ACTIVE PEN, AND ACTIVE PEN AND TOUCH SCREEN THEREOF

(71) Applicant: SHENZHEN GOODIX TECHNOLOGY CO., LTD., Shenzhen (CN)

(72) Inventors: Hong Jiang, Shenzhen (CN); Lingyu Tang, Shenzhen (CN)

(73) Assignee: Shenzhen Goodix Technology Co., Ltd., Shenzhen (CN)

( * ) Notice: Subject to any disclaimer, the term of this patent is extended or adjusted under 35 U.S.C. 154(b) by 0 days.

(21) Appl. No.: 16/125,446

(22) Filed: Sep. 7, 2018

(65) Prior Publication Data

US 2019/0004666 A1 Jan. 3, 2019

Related U.S. Application Data (63) Continuation of application No. PCT/CN2017/077318, filed on Mar. 20, 2017.

(51) Int. Cl.
   *G06F 3/041* (2006.01)
   *G06F 3/044* (2006.01)
   *G06F 3/038* (2013.01)
   *G06F 3/0354* (2013.01)

(52) U.S. Cl.
   CPC .......... *G06F 3/0418* (2013.01); *G06F 3/0383* (2013.01); *G06F 3/03545* (2013.01); *G06F 3/044* (2013.01)

(58) Field of Classification Search
   CPC .. G06F 3/0418; G06F 3/03545; G06F 3/0383; G06F 3/044
   See application file for complete search history.

(56) References Cited

U.S. PATENT DOCUMENTS

| | | | |
|---|---|---|---|
| 2008/0157867 A1 | 7/2008 | Krah | |
| 2010/0059295 A1* | 3/2010 | Hotelling | G06F 3/0416 178/18.06 |
| 2012/0182259 A1 | 7/2012 | Han | |
| 2012/0187959 A1* | 7/2012 | Lin | G06F 3/046 324/633 |
| 2014/0176495 A1* | 6/2014 | Vlasov | G06F 3/03545 345/174 |

(Continued)

FOREIGN PATENT DOCUMENTS

| | | |
|---|---|---|
| CN | 103902133 A | 7/2014 |
| CN | 102929411 B | 9/2015 |

(Continued)

*Primary Examiner* — Lisa S Landis (57) ABSTRACT

A method for processing a signal from an active pen, and an active pen and a touch screen thereof are provided. The method includes: under-sampling a received excitation signal from the active pen with a predetermined sampling frequency to obtain a digital signal of the excitation signal from the active pen, and demodulating the digital signal of the excitation signal from the active pen to obtain a demodulated signal; and calculating touch coordinates according to an amplitude and a phase of the demodulated signal, and outputting the touch coordinates. Embodiments of the present application are intended to improve the signal processing precision of the active pen and improve the signal-to-noise ratio.

7 Claims, 4 Drawing Sheets

(56) References Cited

U.S. PATENT DOCUMENTS

2015/0109263 A1    4/2015   Hargreaves et al.
2015/0286335 A1*   10/2015   Haga .................... G06F 3/0418
                                                                                  345/174

FOREIGN PATENT DOCUMENTS

| | | |
|---|---|---|
| CN | 105607765 A | 5/2016 |
| CN | 105843444 A | 8/2016 |
| WO | 2017007800 A1 | 1/2017 |

* cited by examiner

Under-sampling a received excitation signal from an active pen with a predetermined sampling frequency to obtain a digital signal of the excitation signal from the active pen, and demodulating the digital signal of the excitation signal from the active pen to obtain a demodulated signal ⸺S1

Calculating touch coordinates according to an amplitude and a phase of the demodulated signal, and outputting the touch coordinates ⸺S2

FIG. 4

Amplifying the excitation signal from an active pen ⸺S01

Filtering high-frequency noise from the amplified signal ⸺S02

METHOD FOR PROCESSING SIGNAL FROM ACTIVE PEN, AND ACTIVE PEN AND TOUCH SCREEN THEREOF

CROSS-REFERENCE TO RELATED APPLICATIONS

The present disclosure is a continuation of international application No. PCT/CN2017/077318 filed on Mar. 20, 2017, which is hereby incorporated by reference in its entireties.

TECHNICAL FIELD

The present application relates to the technical field of touch sensing, and in particular, relates to a signal processing method for an active pen, and an active pen and a touch screen thereof.

BACKGROUND

With the development of touch control technologies and mobile terminal technologies, more and more mobile terminals achieve man-machine interactions by means of touch control. At present, touch screens employed by the mobile terminals mainly include capacitive touch screens and resistive touch screens, wherein the capacitive touch screens are popular among more and more people with better definition, light transmittance and touch feeling. The most widely used mobile terminals are mobile phones and tablet computers.

With respect to the capacitive touch screens, touch input operations may be performed by using an active pen instead of a finger, in addition to direct touch operations by using the finger. The principle of the active pen is that the capacitive touch screen receives a signal sent by the active pen via a coupled capacitor. Since the coupled capacitor has an open electrical field, interference signals may be easily coupled, for example display screen interference signals, charger common-mode interference signals and the like. These interference signals may result in a reduction of the signal-to-noise ratio (SNR) of the capacitive touch screen, a decrease of the touch precision and degrade of user experience. Severe interference signals may cause the capacitive touch screen to fail to correctly identify signals sent by a stylus and the like active pens, and thus point jump may be caused.

Therefore, how to improve the signal processing precision of the active pen and improve the signal-to-noise ratio is a technical problem to be urgently solved.

SUMMARY

In view of the above, one of the technical problems to be solved by embodiments of the present application is to provide a method for processing a signal from an active pen, an active pen and a touch screen, to improve the signal processing precision of the active pen and improve the signal-to-noise.

Embodiments of the present application provide a method for processing a signal from an active pen, which is applicable to a touch screen corresponding to the active pen. The method includes:

under-sampling a received excitation signal from the active pen with a predetermined sampling frequency to obtain a digital signal of the excitation signal from the active pen, and demodulating the digital signal of the excitation signal from the active pen to obtain a demodulated signal; and calculating touch coordinates according to an amplitude and a phase of the demodulated signal, and outputting the touch coordinates.

Embodiments of the present application further provide a method for processing a signal from an active pen, which is applied to the active pen. The method includes:

sending an excitation signal from the active pen to a corresponding touch screen, and instructing the touch screen to under-sample the received excitation signal from the active pen with a predetermined sampling frequency to obtain a digital signal of the excitation signal from the active pen.

Corresponding to the above methods, embodiments of the present application further provide a touch screen for processing signal from an active pen. The touch screen includes:

a signal acquiring and demodulating module, configured to under-sample a received excitation signal from the active pen with a predetermined sampling frequency, obtain a digital signal of the excitation signal from the active pen, and modulate the digital signal of the excitation signal from the active pen to obtain a demodulated signal; and a signal processing module, configured to calculate touch coordinates according to an amplitude and a phase of the modulated signal, and output the touch coordinates.

Embodiments of the present application provide an active pen. The active pen is configured to send an excitation signal to a corresponding touch screen, and the touch screen is configured to under-sample the received excitation signal from the active pen with a predetermined sampling frequency to obtain a digital signal of the excitation signal from the active pen.

As seen from the above technical solutions, according to embodiments of the present application, the active pen sends an excitation signal to the touch screen, and the touch screen under-samples the received excitation signal with the predetermined sampling frequency, obtains a digital signal of the excitation signal from the active pen, and demodulates the digital signal of the excitation signal from the active pen to obtain a demodulated signal. As such, touch coordinates are calculated according to an amplitude and a phase of the demodulated signal, and the touch coordinates are output. Therefore, according to the embodiments of the present application, the noise frequency bands with complicated and severe interference may be prevented, such that the signal-to-noise ratio is improved, and meanwhile the sampling frequency during analog-to-digital conversion is indirectly reduced, the cost is saved and the power consumption is lowered.

BRIEF DESCRIPTION OF THE DRAWINGS

To more clearly describe technical solutions according to the embodiments of the present application, drawings that are to be referred for description of the embodiments are briefly described hereinafter. Apparently, the drawings described hereinafter merely illustrate some embodiments of the present application. Persons of ordinary skill in the art may also derive other drawings based on the drawings described herein.

DETAILED DESCRIPTION

According to embodiments of the present application, the active pen sends an excitation signal to the touch screen, and the touch screen under-sample the received excitation signal with the predetermined sampling frequency, obtains a digital signal of the excitation signal from the active pen, and demodulates the digital signal of the excitation signal from the active pen to obtain a demodulated signal. As such, touch coordinates are calculated according to an amplitude and a phase of the demodulated signal, and outputting the touch coordinates. Therefore, according to the present application, the noise frequency bands with complicated and severe interference may be prevented, such that the signal-to-noise ratio is improved, and meanwhile the sampling frequency during analog-to-digital conversion is indirectly reduced, the cost is saved and the power consumption is lowered.

Nevertheless, it is not necessary to require that any technical solution according to the embodiments of the present application achieves all of the above technical effects.

To make a person skilled in the art better understand the technical solutions of the embodiments of the present application, the technical solutions of the present application are clearly and completely described with reference to the accompanying drawings of the embodiments of the present application. Apparently, the described embodiments are only a part of the embodiments of the present application, rather than the entire embodiments. Based on the embodiments of the present application, all other embodiments derived by persons of ordinary skill in the art without any creative efforts shall fall within the protection scope of the present application.

Specific implementations of the embodiments of the present application are further described hereinafter with reference to the accompanying drawings of the present application.

The description hereinafter for the exemplary embodiments may be referenced to the attached drawings thereof. The particular embodiments illustrated by virtue of drawings may be practiced. However, it should be understood that other embodiments may be used and variations of structure may be derived without departing from the range of various embodiments.

The active pen according to the present application may be exemplarily a stylus, and other input apparatuses and/or indication devices may also be applied to various embodiments of the present application.

Figure 1:
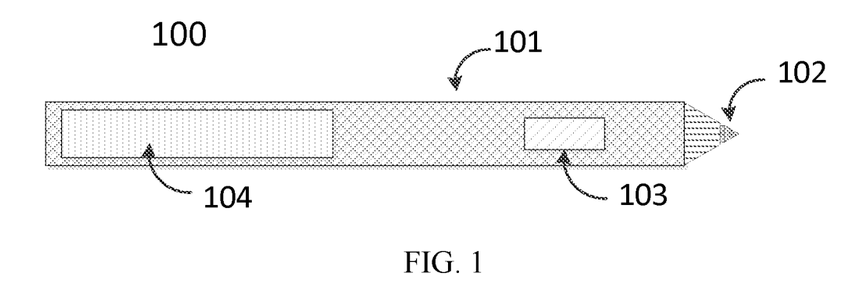
FIG. 1 is an exemplary compositional diagram of an active pen.

FIG. 1 is a structural diagram of an active pen 100 (or referred to as a stylus 100) that is exemplarily used. The active pen 100 includes a pen body 101, a pen nib 102, an inner signal driving circuit 103 and a battery 104. The battery 104 powers the signal driving circuit 103, and the signal driving circuit 103 generates an active excitation signal and sends the active excitation signal to the pen nib 102. The excitation signal from the active pen and a corresponding touch sensor form a capacitor via the pen nib 102, and the capacitor is coupled to the touch screen. The excitation signal from the active pen carries pressure information, key information and the like of the stylus 100, and the touch screen detects and demodulates such information and input the same to an input apparatus of a smart phone, a planar circuit, a tablet computer, or another similar touch device.

The touch screen according to the present application is a panel having a capacitance-sensitive surface; and other panels which have a capacitance-sensitive surface and are capable of sensing touches by objects, or suspended panels may also be used in the embodiments of the present application.

Figure 2:
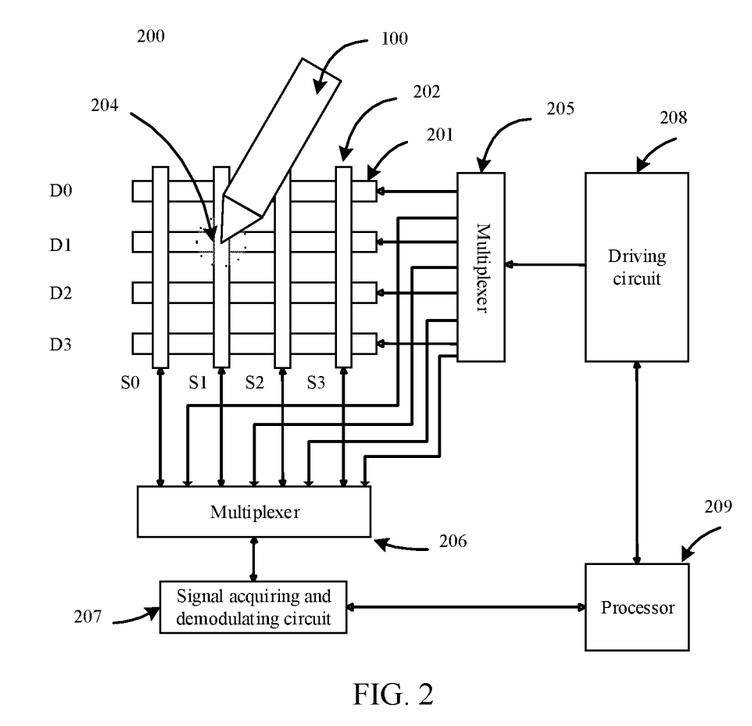
FIG. 2 is a schematic diagram of an example of architecture of a touch system according to the present application.

FIG. 2 is a schematic diagram of an example of architecture 200 of a touch system according to the present application. A finger or a stylus 203 touches a corresponding touch screen. The touch screen includes a plurality of driving sensor channels 201, a plurality of sensing sensor channels 202, multiplexers 205 and 206, a driving circuit 208, a signal acquiring and demodulating module 207 and a signal processing module 209 configured to practice control and digital processing algorithms.

Figure 3:
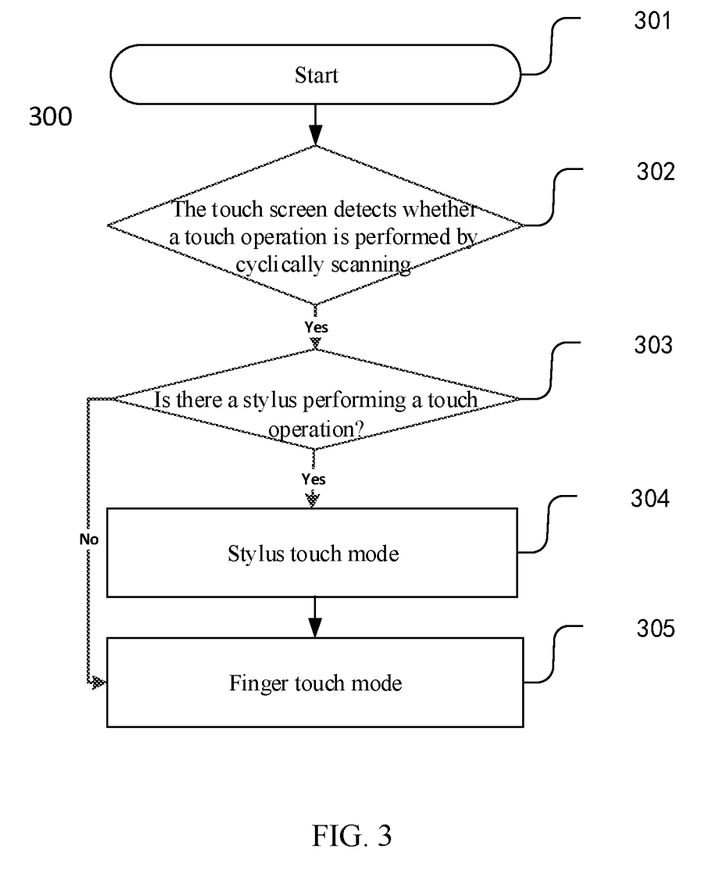
FIG. 3 is a schematic diagram of an example of a working procedure of a touch system according to the present application.

FIG. 3 is a schematic diagram of an example of a working procedure 300 of a touch system according to the present application. The touch system starts entering a working state (301), and whether a user performs a touch operation with a finger or a stylus needs to be determined, that is, a working mode of the touch system. According to a predetermined protocol, the touch screen detects whether a touch operation is performed by cyclically scanning (302). Whether there is a stylus performing a touch operation is determined (303). If it is detected that a stylus performs the touch operation, the touch system is in a stylus touch mode (304). The touch system starts synchronizing signals, detects the demodulated signal and outputs information. If it is detected that no stylus performs the touch operation, the touch system is in a finger touch mode (305). In addition, the touch system may also be in a finger-stylus hybrid working mode.

The finger touch mode may include a self-capacitance detection mode and a mutual-capacitance detection mode. In the self-capacitance detection mode, the signal processing module 209 controls the multiplex 206 such that the sensing sensor channel Sx 202 is grounded. The signal processing module 209 controls the driving circuit 208 to output a driving signal, and the driving signal is transmitted through the multiplexers 205 and 206 and meanwhile sent to the driving sensor channel Dx 201 and the signal acquiring and demodulating module 207. By scanning the driving sensor channel Dx 201, self-capacitance variations of any touch point 204 in the effective region of the touch screen may be detected, and finally, the signal processing module 209 calculates Y-axis coordinates of the touch point according to the self-capacitance variations. Analogously, the signal processing module 209 controls the multiplexer 205, such that the driving sensor channel Dx 201 is grounded. The signal processing module 209 controls the driving circuit 208 to output a driving signal. The driving signal is transmitted through the multiplexers 205 and 206, and then reaches the sensing sensor channel Sx 202 and the signal acquiring and demodulating module 207. By scanning the sensing sensor channel Sx 202, self-capacitance variations of any touch point 204 in the effective region of the touch screen may be detected, and finally, the signal processing module 209 calculates X-axis coordinates of the touch point according to the self-capacitance variations. As such, the signal processing module 209 obtains complete coordinates of any touch point in the effective region of the touch screen, and outputs the obtained coordinates. In the mutual-capacitance detection mode, a capacitance is formed at an intersection between the sensing sensor channel Sx 202 and the driving sensor channel Dx 201, the signal processing module 209 controls the driving circuit 208 to send a driving signal via the multiplexer 205 to the driving sensor channel Dx 201, and the signal processing module 209 controls the multiplexer 206 to select a signal coupled by a mutual-capacitance to transmit to the signal acquiring and demodulating module 207. Herein the driving signal may be singularly sequentially scanned or group-wise scanned. By uninterruptedly scanning the driving sensor channel Dx 201 and the sensing sensor channel Rx 202, the signal processing module 209 may detect mutual-capacitance variations of any touch point 204 in the effective region of the touch screen, and then calculate X-axis coordinates and Y-axis coordinates according to the mutual-capacitance variations and output the calculated coordinates. In the finger touch mode, the signal generated by the driving circuit 208 may be a square wave, a sinusoidal wave, a triangle wave, which, is however, not limited to these waveforms.

In the stylus touch mode, the signal processing module 209 controls the multiplexer 206, such that the sensing sensor channel Sx 202 is grounded, and the driving sensor channel Dx 201 is touched at any touch point 204 in the effective region of the touch screen to form a mutual-capacitance between the touch driving sensor channel Dx 201 and the pen nib of the active pen 203. The active pen 100 sends a driving signal, and the driving signal is transmitted through the mutual-capacitance and the multiplexers 205 and 206 and reaches the signal acquiring and demodulating module 207. By uninterruptedly scanning the mutual-capacitance variations of the driving sensor channel Dx 201, the signal processing module 209 may calculate Y-axis coordinates. Analogously, the signal processing module 209 controls the multiplexer 205, such that the driving sensor channel Dx 201 is grounded, and the driving sensor channel Dx 201 is touched at any touch point 204 in the effective region of the touch screen to form a mutual-capacitance between the touch sensing sensor channel Sx 202 and the pen nib of the active pen 203. The active pen 203 sends a driving signal, and the driving signal is transmitted through the mutual-capacitance and the multiplexer 206 and reaches the signal acquiring and demodulating module 207. By uninterruptedly scanning the mutual-capacitance variations of the driving sensor channel Sx 201, the signal processing module 209 may calculate X-axis coordinates. As such, the signal processing module 209 obtains complete coordinates of any touch point in the effective region of the touch screen, and outputs the obtained coordinates. The driving signal from the active pen may be a square wave, a sinusoidal wave, a triangle wave, which, is however, not limited to these waveforms.

Figure 4:
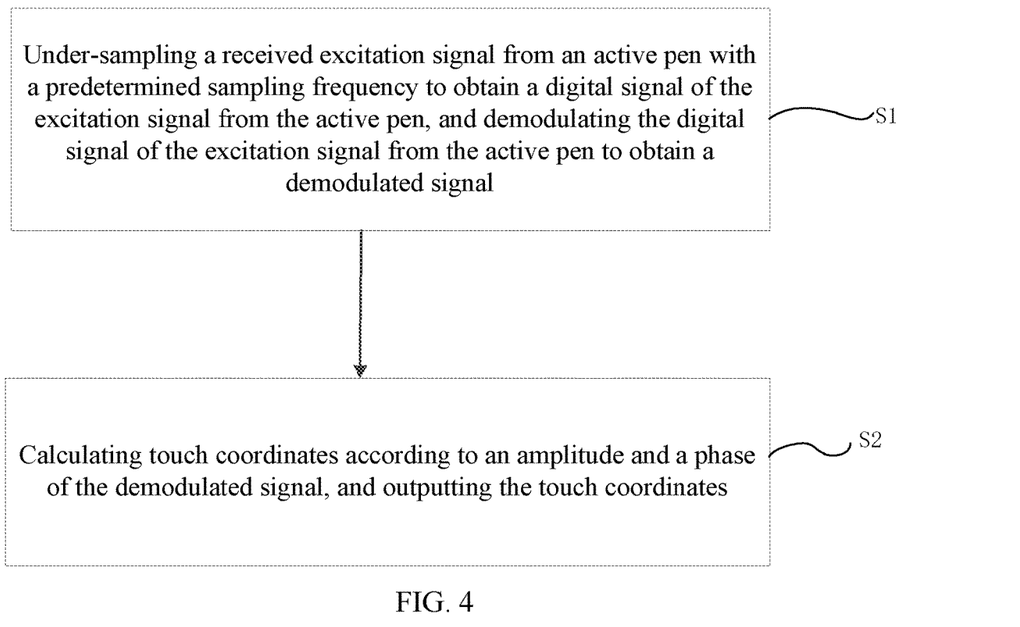
FIG. 4 is a flowchart illustrating a signal processing method for an active pen according to some embodiments of the present application.

Referring to FIG. 4, an embodiment of the present application provides a signal processing method for an active pen, which is applicable to a touch screen corresponding to the active pen. The method includes:

S1: A received excitation signal from the active pen is under-sampled with a predetermined sampling frequency to obtain a digital signal of the excitation signal from the active pen, and the digital signal of the excitation signal from the active pen is demodulated to obtain a demodulated signal.

Specifically, the active pen sends an active excitation signal to the corresponding touch screen. The touch screen under-samples the received active excitation signal with the predetermined sampling frequency. For up-sampling of the received excitation signal from the active pen, a frequency or a bandwidth of the excitation signal from the active pen may be increased and the predetermined sampling frequency fs may be decreased, or the frequency or the bandwidth of the excitation signal from the active pen may be maintained and the predetermined sampling frequency fs may be decreased, or the frequency or the bandwidth of the excitation signal from the active pen is decreased and the predetermined sampling frequency fs is decreased.

Optionally, according to the present application, the frequency or the bandwidth of the excitation signal from the active pen is maintained and the predetermined sampling frequency fs is decreased, such that the analog signal is under-sampled. This specific implementation manner may reduce the cost and the power consumption of the active pen relative to the increase of the frequency or the bandwidth of the excitation signal from the active pen and the decrease of the predetermined sampling frequency fs.

According to the present application, the received excitation signal from the active pen is under-sampled with a low sampling frequency, such that the excitation signal of the active pen is converted from an analog signal into a digital signal. Afterwards, the excitation signal of the active pen that is converted into the digital signal is demodulated to obtain a demodulated signal.

Specifically, the frequency of the digital signal obtained by under-sampling the excitation signal of the active pen is the same as the frequency of a reference signal used for demodulation. When the frequency of the reference signal used for demodulation is lowered, the volume of data used for demodulation may be reduced, the storage volume requirement may be lowered, and the complexity and the cost of the circuit may be reduced, and the demodulation speed may be improved.

S2: Touch coordinates are calculated according to an amplitude and a phase of the demodulated signal, and the touch coordinates are output.

According to the present application, the touch coordinates may be further calculated according to the amplitude and the phase of the demodulated signal. The specific calculation of the touch coordinates is the same as that in the active pen touch mode, which is thus not described herein any further.

According to the embodiment of the present application, the touch screen under-samples the received active excitation signal with the predetermined sampling frequency to obtain the digital signal of the excitation signal of the active pen. In this way, the noise frequency bands with complicated and severe interference may be prevented, such that the signal-to-noise ratio is improved, and meanwhile the sampling frequency during analog-to-digital conversion is indirectly reduced, the cost is saved and the power consumption is lowered.

Figure 5:
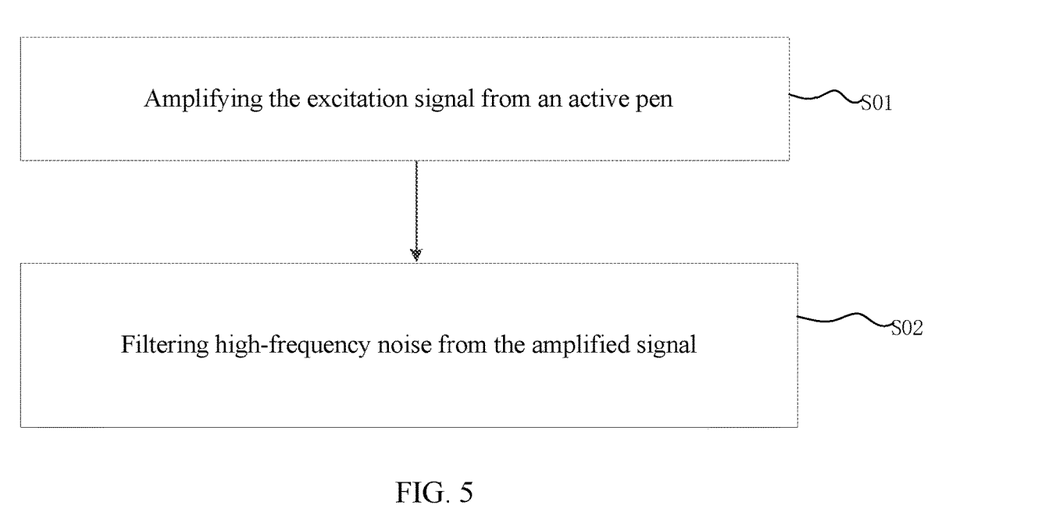
FIG. 5 is a flowchart illustrating a signal processing method for an active pen according to some other embodiments of the present application.

Specifically, referring to FIG. 5, prior to step S1, the method further includes:

S01: amplifying the excitation signal of the active pen; and

S02: filtering high-frequency noise from the amplified signal.

Step S1 specifically includes: under-sampling the signal with the high-frequency noise filtered with the predetermined sampling frequency to obtain the digital signal of the excitation signal of the active pen, and demodulating the digital signal of the excitation signal of the active pen to obtain the demodulated signal.

Figure 6:
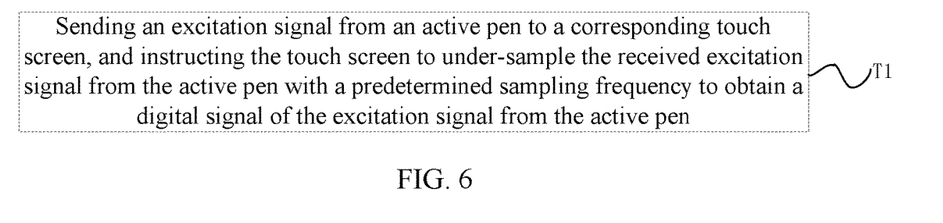
FIG. 6 is a flowchart illustrating a signal processing method for an active pen according to some embodiments of the present application.

Referring to FIG. 6, an embodiment of the present application further provides a signal processing method for an active pen, which is applicable to the active pen. The method includes:

T1: sending an excitation signal of the active pen to a corresponding touch screen, and instructing the touch screen to under-sample the received excitation signal of the active pen with a predetermined sampling frequency to obtain a digital signal of the excitation signal of the active pen.

Specifically, the frequency of the excitation signal of the active pen is higher than a threshold obtained by measuring and calculating a frequency band of noise and interference of the touch screen.

Since the greatest challenge for interference resistance on the current touch screen is resistance to charger common-mode interference and resistance to display screen interference. The common-mode interference caused by the charger mainly includes mains power frequency and harmonics thereof and switch power supply switch frequency and harmonics thereof in terms of spectrum source, whereas the display screen interference mainly includes horizontal and vertical refresh frequency and harmonics thereof generated by picture refresh on the display screen. When these interference signals simultaneously or separately act on the touch screen, strong spectral components may be generated in some frequency bands, and weak spectral components may be generated in some frequency bands. Generally, spectrum distribution in the lower frequency bands is relatively complicated, including, power frequency harmonics and various switch frequency base frequencies. The interference is relatively severe in the lower frequency band. The harmonic components in the higher frequency bands are relatively few, and the switch frequency harmonic interference is dominating.

The touch screen receives the signal sent by the active pen via a coupled capacitor. Generally, display screen interference signals may be coupled. The charger common-mode interference signal, the display screen interference signals and the like noise signals have a low frequency, whereas the touch screen is easily subject to the interference in these noise frequencies when the signal working frequency of the touch screen is several hundreds of KHz.

According to the present application, the threshold is calculated according to the noise interference frequency band in the application environment of the touch screen, such that the active pen generates an active excitation signal having a higher frequency. In this way, interference caused by the display screen interference signal, the charger common-mode interference signal and the like noise signals are prevented.

During practice of the present application, the frequency of the excitation signal from the active pen approaches an integer multiple of the low sampling frequency.

Figure 7:
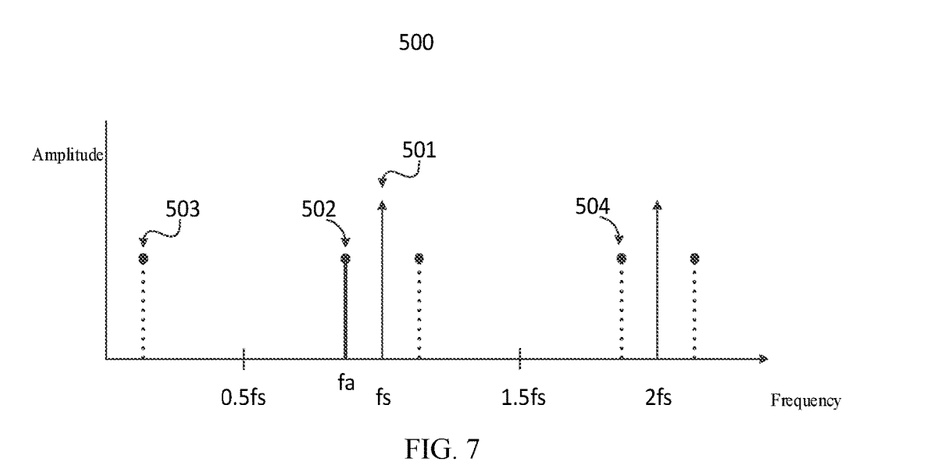
FIG. 7 is a schematic diagram of sampling principles of an analog-to-digital converter according to the present application.
Figure 8:
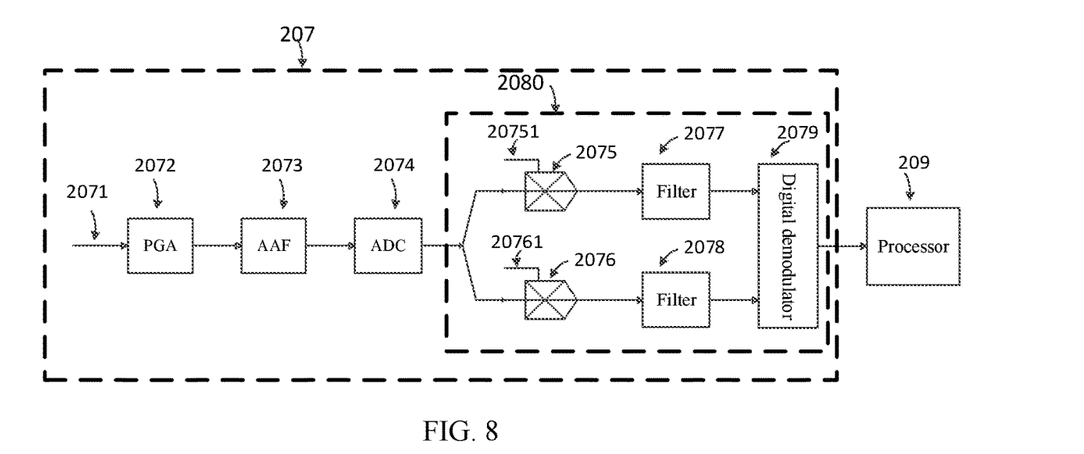
FIG. 8 is a schematic diagram of a touch screen for use in processing a signal of an active pen according to some embodiments of the present application.

Specifically, the Nyquist sampling theorem specifies that the original signal may be restored without any distortion or loss when the signal sampling frequency is at least twice the maximum signal frequency. The Shannon information theorem also indicates that the sampling frequency is a function of the signal bandwidth, and signal distortion may be prevented when the sampling frequency is two-fold higher than the signal bandwidth. According to the present application, to improve the signal frequency and lower the sampling frequency requirement of the analog-to-digital converter, under-sampling is employed if the sampling frequency is not two-fold higher than the bandwidth. Referring to FIG. 7, assume that the excitation signal from the active pen is a narrowband signal 502 having a frequency fa, and the sampling frequency of a sampling signal 501 is fs. The sampling frequency fs of the sampling signal 501 may be slightly higher than the frequency fs of the active excitation signal 502, or may be slightly lower than the frequency fa of the active excitation signal 502. Since the sampling frequency does not satisfy the condition fs >2fa, signals may be overlapped. In FIG. 8, 500 signifies a plurality of mirror signals, which is similar to an analog frequency mixing process. A signal 503 present in a first Nyquist region is a difference between the sampling frequency fs of the sampling signal 501 and the frequency fa of the active excitation signal 502, a signal 504 present in a fourth Nyquist region is a sum of the sampling frequency fs of the sampling signal 501 and the frequency fa of the active excitation signal 502. According to the present application, a high-frequency sum may be filtered by using a filter and a low-frequency sum may be obtained. The entire process is equivalent to down-converting the high-frequency signal to a low-frequency signal and then sampling the signal by using an analog-to-digital converter. As seen from FIG. 7, a difference and a sum may also be present between a two-fold harmonic sampling frequency 2fs and the frequency fa of the active excitation signal 502. That is, an N-fold harmonic sampling frequency Nfs may also be used as the sampling frequency of the sampling signal 501, where N is a natural number. However, during selection of the working frequency fa of the active excitation signal 502, the sampling frequency Nfs of the sampling signal 501 should not be an integer multiple of the working frequency fa of the active excitation signal 502, but the sampling frequency Nfs of the sampling signal 501 approaches an integer multiple of the working frequency fa of the active excitation signal 502. For example, if the sampling frequency of the analog-to-digital converter is 2.2 MHz, the working frequency fa of the active excitation signal 502 shall not be 1.1 MHz, 2.2 MHz and the like integer multiples; but the working frequency fa of the active excitation signal 502 may be a frequency close to the sampling frequency Nfs of the sampling signal 501, for example, 2 MHz, 2.4 MHz, 4.2 MHz, 4.6 MHz, 6.4 MHz, 6.8 MHz or the like. In this case, the frequency of the signal 503 present in the first Nyquist region is 200 KHz, that is, the difference between the sampling frequency fs of the sampling signal 501 and the frequency fa of the active excitation signal 502 is 200 KHz. In other words, the active excitation signal 502 with the working frequency fa being 200 KHz is sampled by using an analog-to-digital converter having the sampling signal 501 with the sampling frequency fs being 2.2 MHz.

Corresponding to the above method, referring to FIG. 2 and FIG. 8, an embodiment of the present application further provides a touch screen for process a signal for an active pen. The touch screen includes:

a signal acquiring and demodulating module 207, configured to under-sample a received excitation signal from the active pen with a low sampling frequency to obtain a digital signal of the excitation signal from the active pen, and modulate the digital signal of the excitation signal from the active pen to obtain a demodulated signal; and a signal processing module 209, configured to calculate touch coordinates according to an amplitude and a phase of the modulated signal, and output the touch coordinates.

During practice of the present application, referring to FIG. 8, the signal acquiring and demodulating module 207 is employed to under-sample and demodulate the active excitation signal generated by the active pen. The signal acquiring and demodulating module 207 includes: an amplifier (PGA) 2072 configured to receive an active excitation signal 2071, an analog filter circuit (AAF) 2073, an analog-to-digital converter (ADC) 2074 and a digital demodulating unit 2080. The digital demodulating unit 2080 includes: a first digital multiplier 2075, a second digital multiplier 2076, a first digital filter 2077, a second digital filter 2078 and a digital demodulator 2079. According to the present application, the signal processing module 209 is employed to calculate touch coordinates according to the amplitude and the phase of the modulated signal, and output the touch coordinates.

The active excitation signal 2071 enters the amplifier (PGA) 2072, and the amplifier (PGA) 2072 amplifies a micro signal to a signal having an amplitude most suitable to working of the analog-to-digital converter (ADC) 2074. The analog filter circuit (AAF) 2073 filters most of the noise in the amplided signal, such that the effective signal enters the analog-to-digital converter (ADC) 2074.

The analog-to-digital converter (ADC) 2074 under-samples the filtered signal, and converts the analog signal into a digital signal. The digital signal is processed by the first digital multiplier 2075, the second digital multiplier 2076, the first digital filter 2077 and the second digital filter 2078, and then enters the digital demodulator 2079. The digital signal is then demodulated and the amplitude and the phase of the digital signal are calculated.

Specifically, the digital signal obtained by under-sampling the excitation signal from the active pen has the same frequency as a reference signal used for demodulation. When the frequency of the reference signal used for demodulation is lowered, the volume of data used for demodulation may be reduced, the storage volume requirement may be lowered, and the complexity and the cost of the circuit may be reduced, and the demodulation speed may be improved.

According to the present application, the signal processing module 209 further calculates the touch coordinates according to the amplitude and the phase of the demodulated signal. The specific calculation of the touch coordinates is the same as that in the active pen touch mode, which is thus not described herein any further.

Specifically, the amplifier (PGA) 2072 may be a programmable amplifier (PGA) with an adjustable gain, and the amplifier may be a single-end amplifier or a differential amplifier. The analog filter circuit (AAF) 2073 may be an active filter, but is not limited to the active filter. The analog-to-digital converter (ADC) 2074 may have an independent channel or a shared channel.

Specifically, the digital demodulating unit according to the present application 2080 includes: the first digital multiplier 2075, the second digital multiplier 2076, the first digital filter 2077, the second digital filter 2078 and the digital demodulator 2079. Demodulation of the digital signal is practiced by using the above circuit (that is, step S22). An output signal of the analog-to-digital converter (ADC) 2074 is $$A \cos(2\pi f_i n + \varphi_i),$$

where $f_i$ is a frequency of the output signal of the analog-to-digital converter (ADC) 2074, and $\varphi_i$ is a phase of the output signal of the analog-to-digital converter (ADC) 2074. The signal processing module 209 locally outputs a reference signal $$\cos(2\pi f_L n)$$

to an input terminal 20751 of the first digital multiplier 2075, and the signal processing module 209 locally outputs Q reference signals $$-\sin(2\pi f_L n)$$

to an input terminal 20761 of the second digital multiplier 2076, where $f_L$ is a frequency of demodulation reference signal locally output by the signal processing module 209. An output signal I of the first digital multiplier 2075 and an output signal Q of the second digital multiplier 2076 are respectively as follows:

$$I = A \cos(2\pi f_i n + \varphi_i) \times \cos(2\pi f_L n) = \quad (1)$$
$$\frac{A}{2}[\cos(2\pi f_i n - 2\pi f_L n + \varphi_i) + \cos(2\pi f_i n + 2\pi f_L n + \varphi_i)].$$

$$Q = A \cos(2\pi f_i n + \varphi_i) \times [-\sin(2\pi f_L n)] = \quad (2)$$
$$-\frac{A}{2}[\sin(2\pi f_i n - 2\pi f_L n + \varphi_i) + \sin(2\pi f_i n + 2\pi f_L n + \varphi_i)]$$

The frequency $f_i$ of the output signal of the analog-to-digital converter (ADC) 2074 is the same as the frequency $f_L$ of the demodulation reference signal locally output by the signal processing module 209, that is, $f_i=f_L$. A sum of the two frequencies is filtered and a difference therebetween is maintained, and the obtained I and Q signals are vector signals. Finally, the digital demodulator 2079 calculates the amplitude and the phase of the demodulated signal.

$$\text{Amplitude} = \sqrt{I^2 + Q^2} \quad (3)$$

$$\text{Phase} = \tan^{-1}\frac{Q}{I} \quad (4)$$

Specifically, the first digital filter 2077 and the second digital filter 2078 may be low pass filters.

The signal processing module 209 scans and detects variations of the demodulated signal, then determines, via calculation based on an algorithm, whether there is a touch action and calculates coordinates and the like of a touch point in the effective region of the touch screen, and finally outputs the coordinates to an external interface.

Therefore, with the method according to the present application, the signal-to-noise ratio of the active pen may be significantly improved, such that the objectives of improving the touch precision and reducing the cost and the power consumption of the analog-to-digital converter are achieved.

Referring to FIG. 1, an embodiment of the present application further provides an active pen. The active pen sends an excitation signal from the active pen to a corresponding touch screen, and instructs the touch screen to under-sample the received excitation signal from the active pen with a predetermined sampling frequency to obtain a digital signal of the excitation signal from the active pen.

Specifically, the frequency of the excitation signal from the active pen is higher than a threshold obtained by measuring and calculating a frequency band of noise and interference of the touch screen.

During practice of the present application, the frequency of the excitation signal from the active pen approaches an integer multiple of the low sampling frequency.

Although preferred embodiments of the present application are described, those skilled in the art may make modifications and variations to these embodiments based on the basic inventive concept of the present application. Therefore, the appended claims are interpreted as covering the preferred embodiments and all such modifications and variations falling within the protection scope of the embodiments of the present application. Apparently, a person skilled in the art may make various modifications and variations to the present application without departing from the spirit and principles of the present application. If such modifications and variations fall within the scope defined by the claims of the present application and equivalent technologies thereof, the present application is intended to cover such modifications and variations.

What is claimed is:

1. A method for processing a signal from an active pen, the method being applicable to a touch screen corresponding to the active pen, wherein the method comprises:
   under-sampling a received excitation signal generated by the active pen with a predetermined sampling frequency to obtain a digital signal of the excitation signal generated by the active pen, wherein the excitation signal generated by the active pen has a frequency higher than a threshold obtained according to a frequency band of noise and interference signals in an application environment of the touch screen; and the frequency of the excitation signal generated by the active pen is unequal but close to an integer multiple of the predetermined sampling frequency, and demodulating the digital signal of the excitation signal generated by the active pen to obtain a demodulated signal; and
   calculating touch coordinates according to an amplitude and a phase of the demodulated signal, and outputting the touch coordinates.

2. The method according to claim 1, wherein the under-sampling a received excitation signal generated by the active pen with a predetermined sampling frequency comprises:
   amplifying the excitation signal generated by the active pen;
   filtering high-frequency noise from the amplified signal; and
   under-sampling the signal with the high-frequency noise filtered with the predetermined sampling frequency.

3. The method according to claim 1, wherein the digital signal obtained by under-sampling the excitation signal generated by the active pen has the same frequency as a reference signal used for demodulation.

4. A touch screen, comprising:
   a signal acquiring and demodulating module, configured to under-sample a received excitation signal generated by the active pen with a predetermined sampling frequency, obtain a digital signal of the excitation signal generated by the active pen, wherein the excitation signal generated by the active pen has a frequency higher than a threshold obtained according to a frequency band of noise and interference signals in an application environment of the touch screen; and the frequency of the excitation signal generated by the active pen is unequal but close to an integer multiple of the predetermined sampling frequency, and demodulate the digital signal of the excitation signal generated by the active pen to obtain a demodulated signal; and
   a signal processing module, configured to calculate touch coordinates according to an amplitude and a phase of the demodulated signal, and output the touch coordinates.

5. The touch screen according to claim 4, further comprising:
   an amplifier, configured to amplify the excitation signal generated by the active pen; and
   a filter circuit, configured to filter high-frequency noise from the amplified signal;
   wherein the signal acquiring and demodulating module is configured to under-sample the signal with the high-frequency noise filtered with the predetermined sampling frequency, obtain the digital signal of the excitation signal generated by the active pen, and demodulate the digital signal of the excitation signal generated by the active pen to obtain the demodulated signal.

6. The touch screen according to claim 4, wherein the digital signal of the excitation signal generated by the active pen has the same frequency as a reference signal used for demodulation.

7. An active pen, wherein the active pen is configured to generate an excitation signal and send to a corresponding touch screen, and the touch screen is configured to under-sample the received excitation signal generated by the active pen with a predetermined sampling frequency, and obtain a digital signal of the excitation signal generated by the active pen, wherein the excitation signal generated by the active pen has a frequency higher than a threshold obtained according to a frequency band of noise and interference signals in an application environment of the touch screen; and the frequency of the excitation signal generated by the active pen is unequal but close to an integer multiple of the predetermined sampling frequency.

* * * * *